United States Patent [19]
Schulze

[11] 4,191,464
[45] Mar. 4, 1980

[54] BLADE TYPE FOCAL PLANE SHUTTERS

[75] Inventor: Heinz Schulze, Dresden, German Democratic Rep.

[73] Assignee: Veb Pentacon Dresden Kamera und Kinowerke, Dresden, German Democratic Rep.

[21] Appl. No.: 831,651

[22] Filed: Sep. 8, 1977

[30] Foreign Application Priority Data

Sep. 13, 1976 [DD] German Democratic Rep. ... 194762

[51] Int. Cl.² .............................................. G03B 9/40
[52] U.S. Cl. .................................... 354/246; 354/249
[58] Field of Search ................ 354/31, 246, 152, 154, 354/245, 247, 248, 249

[56] References Cited
U.S. PATENT DOCUMENTS

| | | | |
|---|---|---|---|
| 2,927,519 | 3/1960 | Matsuda | 354/246 |
| 3,675,561 | 7/1972 | Schwarz | 354/245 |
| 3,864,699 | 2/1975 | Tsunekawa et al. | 354/31 |

*Primary Examiner*—Russell E. Adams
*Attorney, Agent, or Firm*—William A. Drucker

[57] ABSTRACT

The blade-type focal plane shutter formed with a plurality of telescopically operating opening blades movable in front of a film gate. A drive lever for the opening blades is operatively connected to said opening blades and carries a diffusedly reflecting mirror which before the commencement of the exposure operation lies in front of the opening blades in the film gate and is movable out of the film gate during the opening movement of the opening blades. The mirror together with the opening blades forms a reflection factor which corresponds to the mean reflection factor of different film types.

6 Claims, 2 Drawing Figures

BLADE TYPE FOCAL PLANE SHUTTERS

BACKGROUND OF INVENTION

The invention relates to a blade-type focal-plane shutter having a plurality of opening blades telescopically movable in front of the film.

In photographic cameras with photoelectrically regulated exposure times it is known to illuminate the photoelectric transducer by the light reflected by the leading and partially mirror-coated shutter curtain. This surface mirror-coating known in curtain-type shutters is not usable for telescopically mutually movable opening blades, because the friction of the blades on one another attacks the surface mirror-coating. To compensate for the difference between the reflection capacity of an opening curtain which is not especially pre-treated and the reflection capacity of the film, it is further known to switch off composite capacitors by switch actuation during the opening movement of the shutter. The moment of this switch actuation is not precisely determinable, on account of the high running speed of the opening blades.

The invention has the purpose of effecting the illumination of the photoelectric transducer by light reflection in the region of the film plane even before and during the opening movement of the shutter, and has the problem of providing a measure suitable for blade-type focal-plane shutters.

SUMMARY OF INVENTION

According to the invention this is achieved in that with a drive lever for the opening blades there is connected a diffusedly reflecting mirror which lies in front of the opening blades in the film gate before the commencement of the exposure operation and is movable out of the film gate during the opening movement of the opening blades, which mirror together with the opening blades forms a reflection factor which corresponds to the mean reflection factor of different film types. According to a preferred embodiment the mirror is arranged on a mirror lever connected with the drive lever. According to a further embodiment the mirror lever is formed as coupling lever between the drive lever and the associated scissors lever. The mirror is expediently arranged in a depression of the mirror lever. The mirror can consist advantageously of a coat of paint or aluminium applied by spraying or vaporisation, or can equally be formed by stuck-on mirror foils.

BRIEF DESCRIPTION OF DRAWINGS

The invention is explained in an illustrated and described example of embodiment.

DESCRIPTION OF PREFERRED EMBODIMENT

Figure 1:
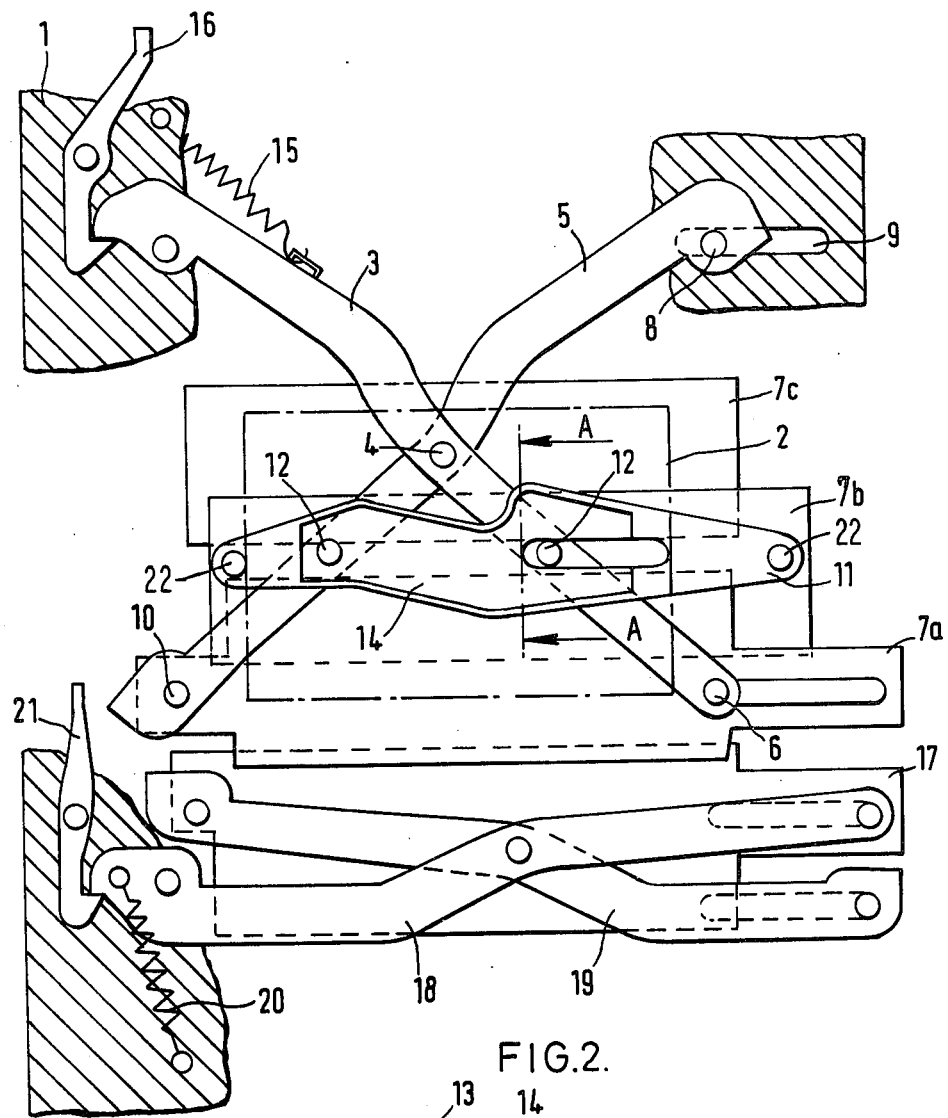
FIG. 1 shows a shutter formed in accordance with the invention.

In the camera housing 1 (see FIG. 1), behind the film gate 2 there is arranged the shutter mechanism which covers the film and clears the film only during the exposure operation. The drive lever 3 mounted in the camera housing is geared by the journal 4 with the scissors lever 5 and by the guide pin 6 with the first opening blade 7a. The scissors lever 5 is guided with the slide pin 8 in the slot 9; the scissors lever 5 is coupled by the joint pin 10 with the other side of the first opening blade 7a.

Figure 2:
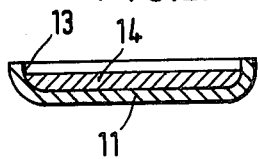
FIG. 2 shows the section along the line A—A in FIG. 1.

The mirror lever 11 formed as a coupling lever is geared by the pins 12 with the drive lever 3 and with the scissors lever 5. With further pins 22 the mirror lever 11 is coupled with the second opening blade 7b. In order to avoid damage to the mirror surface the mirror 14 is situated in the depression 13 (see FIG. 2) of the mirror lever 11. The reflection capacity of the mirror 14 is designed so that together with the reflection properties of the metallic opening blades 7, within the film gate 2 a reflection factor is formed which corresponds to the mean reflection factor of different film types. The drive lever 3 is held against the opening spring 15 by the opening pawl 16. The closing blades 17 are movable by the further levers 18 and 19 of the scissors form; this lever pair 18, 19 is held against the drive spring 20 by the closing pawl 21.

The manner of operation of the arrangement is as follows:

When the shutter is in the cocked position as illustrated the opening blades 7 cover the film gate 2 and prevent the access of light to the film. The metallic opening blades 7 and the mirror 14 reflect approximately the same quantity of light which the film would reflect when the shutter is opened completely. By actuation of the opening pawl 16 the drive lever 3 subject to the action of the opening spring 15 is released. The opening blades 7 are moved rapidly out of the film gate 2 by means of the scissors lever 5 and together with the mirror lever 11. Thus the film gate 2 is opened. A photoelectric receiver upon which reflected light strikes perceives no photometrically relevant difference between closed and opened shutter, when at the beginning of the opening movement of the opening blades 7 the start switch for the time-formation electronic system for the regulation of the exposure time is actuated in known manner. After the time interval ascertained by the time formation electronic system the closing pawl 21 is actuated electromagnetically in likewise known manner. The closing blades 17 are caused by the drive spring 20, through the levers 18 and 19, to close the film gate 2. Thus the exposure operation is terminated.

I claim:

1. A blade-type focal plane shutter for a camera of the type having an exposure determining system therein, said shutter comprising:
   (a) a plurality of opening blades for movement in front of a film gate,
   (b) a drive lever for the opening blades, and
   (c) means for diffusedly reflecting light positioned parallel to the focal plane and operatively connected to said drive lever, which reflecting means before the commencement of the exposure operation lies in front of the opening blades in the film gate and is movable out of the film gate during the opening movement of the opening blades in a path parallel to the focal plane, said reflecting means together with the opening blades forming a reflection factor which corresponds to the mean reflection factor of different film types.

2. A blade-type focal-plane shutter according to claim 1, wherein the reflecting means is arranged on a lever connected with the drive lever.

3. A blade-type focal-plane shutter according to claim 2 wherein a scissors lever is provided and the lever is formed as coupling lever between the drive lever and the scissors lever.

4. A blade-type focal-plane shutter according to claim 2, wherein the reflecting means is arranged in a depression of the lever.

5. A blade-type focal-plane shutter according to claim 4, wherein the reflecting means consists of a coating of paint or aluminium applied by spraying or vaporisation.

6. A blade-type focal-plane shutter according to claim 4, wherein the reflecting means consists of stuck-on mirror foil.

* * * * *